Patented Nov. 24, 1931

1,833,038

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

PROCESS OF PRODUCING AQUEOUS DISPERSIONS OF WATER IMMISCIBLE BODIES

No Drawing. Application filed October 17, 1922. Serial No. 595,213.

I have discovered that it is possible to produce aqueous dispersions of bodies or substances, many of which have heretofore resisted efforts so to disperse them and have been regarded as impossible of aqueous dispersion. Among such bodies, as may be dispersed in water by the process which I shall hereinafter set forth, are crude rubber, balata, gutta percha, noncolloidal sulphur-terpenes, natural and synthetic resins, vegetable and mineral waxes, gums, tars, pitches, bitumens, animal and vegetable oils, etc., which are soluble in nonaqueous solvents.

This is accomplished by the employment of a colloid, which, in the examples hereinafter described takes the form of a soap. The colloid is caused to be disseminated through the mass to be dispersed, and forms protective films or coatings for the dispersed particles. In the examples which I have hereinafter described, the soap may be formed in situ by first disseminating through the mass a saponifiable substance and then incorporating a saponifying agent. The addition of water to the mass, which in the examples hereinafter given is partly coincident with the addition of the saponifying agent, finally results in the dispersion of the water-insoluble body in the aqueous medium. The mass to be dispersed may be conditioned for dispersion by the employment of a suitable solvent, which is abstracted from the final product after the dispersion is effected. I have hereinafter described in detail a process, constituting one mode of practicing the invention, by which such water-insoluble bodies hereinbefore referred to may be dispersed in water.

Stated briefly, such process consists first in dissolving the substance to be dispersed in a suitable solvent, and then replacing the solvent in whole or in part with water, without throwing down, precipitating or coagulating the dissolved substance but leaving it as the disperse phase in the continuous aqueous phase. In accomplishing this result, it is necessary, when the substance to be dispersed does not of itself contain or have as a component thereof a dispersing agent, to add or to form in situ a dispersing colloidal agent, preferably in the form of an ammonium soap. In many cases, where the agent is to be formed in situ in the solution of the body to be dispersed a saponifiable substance is dissolved in the solution, and to the water, in which the body is to be dispersed is added the saponifying matter; so that, when the water is mixed into the solution, the said substance is saponified and acts as the dispersing agent, being in such case diffused or dispersed throughout the mass. In using the term "saponify", I do not mean to imply that the substance is necessarily hydrolyzed (though this may indeed take place), as I employ the term in the broader sense that the saponifiable substance may form a soap. Thus as the saponifiable substance I may use either oleic acid or a suitable liquid glyceride or mixture of glycerides such as a vegetable oil.

Care must be exercised in the selection of the solvent for the body to be dispersed. In some cases the alcohols may be employed, whereas in others benzol, toluol, xylol or other solvents of the aromatic or carbocyclic series should be employed. The character of the soap which is utilized as the dispersing agent for stabilizing the dispersion depends to some extent upon the character of the body to be dispersed, but in most cases ammonium oleate is the most satisfactory, although of course it will be understood that the process is not necessarily limited to the use thereof. Certain metallic soaps have the effect of coagulating or throwing down some of the dispersed bodies and their use should be avoided where such bodies are employed. In fact, so far as my work has progressed, ammonia soap appears to be the only soap which should be used as a dispersing agent in forming an aqueous dispersion of rubber, balata or gutta percha, when it is desired to form the soap in situ in the rubber solution, since the saponification may be accomplished at a relatively low temperature at which coagulation of the disperse phase of the dispersion is avoided.

I herein set forth certain typical examples of the mode of carrying out my process and producing aqueous dispersions of bodies which are immiscible with or insoluble in water, but it will be understood that the invention is in no wise limited thereto.

*Example I.*—For the production of an aqueous crude rubber dispersion, I proceed as follows: In 750 grammes of benzene (or commercial "benzol"), dissolve 250 grammes of crude rubber (balata or gutta percha) and 25 grammes of oleic acid, with proper agitation until the oleic acid is diffused throughout the mass. Thoroughly mix 20 grammes of 26° aqua ammonia with 750 grammes of water. Then add and thoroughly mix the water with the rubber solution. The dispersed or diffused particles of oleic acid are saponified by the ammonia in situ, forming an ammonia soap which acts as a dispersing agent and stabilizes the final dispersion. As the ammoniated water is added to and stirred in the rubber-benzol solution, it will be observed that at first the water forms the disperse phase of the dispersion, but, as the total volume of water increases, there is a change of phase, and the water then constitutes the continuous phase. The final dispersion is a white milky mass which may be diluted practically to any reasonable or operative extent with water. It may be used as thus produced, but, if desired, the solvent may be removed by evaporation, but preferably in a vacuum still at a low temperature (say, not over 50° C.) for recovery of the solvent. The dispersed rubber may be easily coagulated by the common materials employed for coagulating crude rubber and the rubber thus coagulated has the characteristics of the rubber prior to its dispersion. It may be vulcanized with the same sulphur factor and heat coefficient as the original crude rubber.

*Example II.*—To produce an aqueous dispersion of paraffin, noncolloidal sulphur-terpene (such as commercially termed Toron), or other body soluble in benzol, toluol, xylol or the like,—one may substitute either for an equivalent amount of rubber and proceed as in Example I.

*Example III.*—A dispersion of two or more different bodies, such as rubber, paraffin and resin, may be secured by dissolving the bodies in the same solvent,—benzol for example,—together with oleic acid, and then mixing with the solution an amount of water, equal to the benzol, to which was added ammonia in excess of that required to saponify the oleic acid, as given in Example I.

*Example IV.*—Those bodies which are soluble in alcohol may be dissolved therein, following substantially the procedure outlined in Example I, but substituting alcohol for the benzene or other solvent of the aromatic or carbocylic series. Thus 250 grammes gum sandarac together with 25 grammes of oleic acid may be dissolved in 750 grammes of ethyl alcohol; and 750 grammes of water with 20 grammes of 26° aqua ammonia gradually mixed therewith, and an apparently clear liquid produced, from which the alcohol may be evaporated. The aqueous dispersion thus produced may be mixed with those dispersions produced by the utilization of other solvents for the dispersed bodies.

I regard it as more desirable to form the dispersing or stabilizing agent in situ, as it is thereby possible to secure a greater or more thorough diffusion of the particles of soap throughout the mass than when the soap is first formed and then added either to the water or to the solution; but, of course, in those cases where for commercial or economical reasons it is expedient to employ an externally formed soap, I should not regard its use necessarily as a departure from the spirit of the invention. Again, in certain cases, the body itself may contain saponifiable constituents, as in the case of some of the resins; and, in such event, the mere addition of a saponifying agent, such as ammonia, may be sufficient for the formation of a sufficient proportion of resin soap to act as a dispersing agent for the remainder of the resinous bodies, without the addition to the solution of oleic acid or other saponifiable agent.

In the examples hereinbefore given, as illustrative of various dispersions and the process of producing them, it will be noted that a small proportion of soap to the dispersible body is employed, and also that the ammonia is in excess of that required for the saponification of the oleic acid. Approximately 10% or less of oleic acid (by weight) to the dispersible body is sufficient to furnish, with the requisite amount of ammonia, enough soap for the most minute subdivision and dispersion of the body throughout the continuous aqueous phase. In the case of rubber dispersion, the dispersed particles are globular, and in size approximate and in many cases are no larger than the rubber globules in rubber latex. Since ammonium oleate is unstable and easily breaks down, it is quite likely that the excess ammonia serves to prevent such breaking down. While I am able to produce dispersions by a process wherein the ammonia is in amount just sufficient to saponify the oleic acid, yet the dispersion of the dispersed body is not so fine as when the ammonia is in excess. The particles are of such order of minuteness, as to permit of the development of the Brownian movement.

When any of these aqueous dispersions are formed, the disperse phase thereof may be coagulated or precipitated from the continuous phase by the use of a suitable agent such as acetic or other acid, or alum, or other substance commonly employed for coagulating rubber from the latex, or by the use of heat or continued stirring, as the case may be.

Such aqueous dispersions as herein described may be employed in the manufacture of all kinds of felted fabrics, as for example in the production of felt for hat bodies, shoe stiffeners, slippers, etc., or in the manufacture of paper, cardboard, box board, sheathing or roofing paper or felt, leather board,—the character of the dispersed body depending upon the characteristics which the manufactured article should possess. Thus in the manufacture of a tough water-repellent paper, which may be flexed without breaking and which is torn with difficulty, both crude rubber and paraffin (or other suitable water-repelling body) are dispersed as herein set forth; and, after the fibrous stock has been beaten in the usual beating engine to the desired extent, the beater roll is lifted from the bed plate, and sufficient dispersion (say, 2.5% of the dispersed bodies to 100% by weight of dry fiber) is added to the beater content and the operation of the roll continued until the dispersion is thoroughly incorporated in the fibrous mass. In the case of rubber, the agitation is ordinarily sufficient to effect the coagulation of the rubber particles which adhere to the fibers, but it is at times desirable to add a precipitating or coagulating agent. The water runs clear with little or no waste of the precipitated or coagulated size. The pulp is then sheeted on any suitable paper machine, either in a continuous web or in a tube on the make-up roll of a wet machine. In the event that a web is formed by a multi-cylinder machine, the top or bottom (or both) laminations of the sheet may be formed of any usual paper stock, and one or more intermediate layers may be formed of the rubberized or paraffined or other sized stock, or these conditions may be reversed and only the outer layers or laminations (on one face or both) of the sheet be formed of the sized stock. Where the dispersed body is capable of coalescence under heat (e. g. pitches, bitumen, resins, waxes, gums), the sheet may be heated (and pressed, if desired) sufficiently after its formation to effect such coalescence. It will be seen from the foregoing that papers or felted sheets having the desired physical characteristics, may be produced by the use of a suitable aqueous dispersion incorporated in the pulp prior to the formation of the sheet.

Coated or treated webs or fabrics may be produced by passing previously formed sheets through an aqueous dispersion of the desired body or substance. To assist in the penetration of the body into the fabric, it is desirable in some instances not to effect the evaporation of the solvent in which such body was previously dissolved. Thus in the case of the so-called Toron (a noncolloidal sulphur-terpene), a cotton tire fabric or cord may be prepared by passing it through an aqueous dispersion of such sulphur-terpene from which the benzol has not been removed,—the subsequent drying of the fabric effecting the evaporation of the solvent.

In other cases, however, the solvent may be recovered from the dispersion prior to the treatment of the fabric with the latter, thereby obviating the necessity of a recovery apparatus in the fabric-treating plant.

In the manufacture of leather board or soles for footwear, one may incorporate in the pulped scrap leather a rubber dispersion together with suitable compounding materials, and form the pulped mass into sheets either by use of a paper machine or by rolling it out. In this, as in other cases, where the product may be subjected to vulcanization, there may be dissolved in the benzol or other equivalent solvent a certain amount of sulphur (sufficient to effect the vulcanization of the rubber), together with the rubber and oleic acid, before adding the ammoniated water. Then, when the sheet is formed of the pulped fiber, and is dried, the sheet may be subjected to a vulcanizing temperature (under pressure, if desired) to vulcanize the sheet. In lieu of pulped leather, one may utilize a pulp formed of various animal or vegetable fibers, or both, such as cattle hair, wood pulp, cotton rags, etc.

Aqueous dispersions of various bodies such as herein referred to may be utilized for various other purposes, depending upon the characteristics of the dispersed bodies. Thus they may be employed as shoe pastes, leather dressings, or floor and furniture polishes, or may be used for waxing threads or cords, or for sizing various materials.

In reference to the use of solvents for the bodies to be dispersed, those hydrocarbon solvents, of the aliphatic or paraffin series such as produced from petroleum, e. g. benzin, appear to be ineffective in producing a dispersion of certain of the bodies,—although, as I have already stated, certain bodies may be dissolved in alcohol prior to their dispersion in water. Of course, when the dispersing agent is formed in situ, the body to be dispersed preferably should be soluble in the same solvent in which is dissolved the body to be dispersed. But on the other hand as the dispersing agent, sulphonated oils, e. g. sulphonated castor oil, may in some cases be employed.

Again, when it is desired to effect the vulcanization of a sheet or other article, having incorporated therein rubber (dispersed by my process), one may employ any suitable process of vulcanization, as for example the cold process of vulcanization in which sulphur chloride is utilized, or a process in which hydrogen sulphide and sulphur dioxide are used.

While I have herein described the aqueous dispersion of crude or coagulated rubber, balata and gutta-percha, which originally occurs in nature dispersed in globular form in various lattices, I do not herein specifically claim the process of dispersion of such coagulated bodies or the products produced thereby, since these form the subject-matter of my application Serial No. 604,616, filed December 2, 1922.

This is a continuation, so far as generic subject-matter is concerned, of my application Serial No. 583,903, filed August 23, 1922.

What I claim is:—

1. A process of dispersing in water water-insoluble bodies which are soluble in organic solvents, which comprises dissolving such a body, together with a saponifiable agent, in an organic solvent, incorporating in such solution water and a saponifying agent to produce a colloidal dispersing agent in situ in the mass, dispersing such solution with the aid of said dispersing agent in water, and by vacuum distillation removing said solvent, thereby leaving said water-insoluble body dispersed in fine particle size in the water.

2. A process of dispersing gum sandarac in water, which comprises dissolving the same in alcohol together with oleic acid, then adding and mixing water and ammonia thereto, and finally removing the alcohol by evaporation.

3. A process of dispersing in water water-immiscible bodies which are soluble in organic solvents, which comprises dissolving such a body in said last-mentioned solvent, dispersing such solution with agitation in an aqueous medium in water containing a colloidal dispersing agent while maintaining the solvent with the water-immiscible body, and finally vacuum-distilling the solvent, thereby leaving said water-immiscible body dispersed in fine particle size in the water.

4. A process of dispersing in water water-immiscible bodies which are soluble in organic solvents, which comprises dissolving such a body in said last-mentioned solvent, dispersing such solution with agitation in an aqueous medium in water containing a colloidal dispersing agent while maintaining the solvent with the water-immiscible body, and finally vacuum-distilling the solvent below 50° C., thereby leaving said water-immiscible body in fine particle size in the water.

In testimony whereof I have affixed my signature.

WILLIAM BEACH PRATT.